US012802859B2

(12) United States Patent
Nogués Barrieras et al.

(10) Patent No.: US 12,802,859 B2
(45) Date of Patent: Nov. 17, 2026

(54) NON-LIQUID IMMERSED TRANSFORMER

(71) Applicant: Hitachi Energy Ltd, Zurich (CH)

(72) Inventors: Antonio Nogués Barrieras, Saragossa (ES); Rafael Murillo, Saragossa (ES); Carlos Roy Martin, Saragossa (ES); Lorena Cebrián Lles, Saragossa (ES)

(73) Assignee: Hitachi Energy Ltd, Zurich (CH)

( * ) Notice: Subject to any disclaimer, the term of this patent is extended or adjusted under 35 U.S.C. 154(b) by 886 days.

(21) Appl. No.: 17/634,767

(22) PCT Filed: Aug. 13, 2020

(86) PCT No.: PCT/EP2020/072699
§ 371 (c)(1),
(2) Date: Feb. 11, 2022

(87) PCT Pub. No.: WO2021/028514
PCT Pub. Date: Feb. 18, 2021

(65) Prior Publication Data

US 2022/0328234 A1 Oct. 13, 2022

(30) Foreign Application Priority Data

Aug. 14, 2019 (EP) .................................... 19382713

(51) Int. Cl.
*H01F 27/16* (2006.01)
*H01F 27/28* (2006.01)

(52) U.S. Cl.
CPC ......... *H01F 27/16* (2013.01); *H01F 27/2876* (2013.01)

(58) Field of Classification Search
CPC ...... H01F 27/16; H01F 27/2876; H01F 27/10; H01F 27/306

(Continued)

(56) References Cited

U.S. PATENT DOCUMENTS 1,394,044 A * 10/1921 Stephens ............. H01F 27/2876 336/62
2,577,825 A 12/1951 Strickland
(Continued)

FOREIGN PATENT DOCUMENTS

CN 2239654 Y * 11/1996
CN 201185116 Y * 1/2009
(Continued)

OTHER PUBLICATIONS

International Search Report and Written Opinion of the International Searching Authority, PCT/EP2020/072699, mailed Nov. 5, 2020, 11 pages.

(Continued)

*Primary Examiner* — Tuyen T Nguyen
(74) *Attorney, Agent, or Firm* — Sage Patent Group

(57) ABSTRACT

A non-liquid immersed transformer is provided. The transformer includes a magnetic core and a coil winding forming a plurality of winding turns around the magnetic core and a cooling system. The cooling system includes a heat exchanger, a main feeding pipe and a main return pipe, and a cooling pipe for the flow of a cooling fluid. The cooling pipe extends at least partly along the coil winding between a first point adjacent to an end of the coil winding, and a second point adjacent to the other end of the coil winding. The cooling pipe also includes a plurality of convolutions to extend the path of the cooling fluid between one end of the winding and one of the main feeding pipe and the main return pipe.

20 Claims, 2 Drawing Sheets

(58) Field of Classification Search
USPC .................................................. 336/55–62
See application file for complete search history.

(56) References Cited

U.S. PATENT DOCUMENTS

| | | | |
|---|---|---|---|
| 2,929,036 | A | 3/1960 | Baxter |
| 5,097,241 | A | 3/1992 | Smith et al. |
| 5,682,292 | A | 10/1997 | Salanki |
| 2005/0243502 | A1 | 11/2005 | Griesinger et al. |
| 2008/0295998 | A1 | 12/2008 | Aiello et al. |
| 2009/0066453 | A1 | 3/2009 | Koivuluoma et al. |
| 2010/0156583 | A1 | 6/2010 | Solar et al. |
| 2012/0262264 | A1 | 10/2012 | Engelage et al. |
| 2012/0268227 | A1 | 10/2012 | Howes et al. |
| 2015/0123756 | A1 | 5/2015 | Hyde et al. |

FOREIGN PATENT DOCUMENTS

| | | | | |
|---|---|---|---|---|
| CN | 102349121 | A | 2/2012 | |
| CN | 102696082 | A | 9/2012 | |
| CN | 103597559 | A | 2/2014 | |
| CN | 105513757 | A | 4/2016 | |
| CN | 105513763 | A | 4/2016 | |
| CN | 107924747 | A | 4/2018 | |
| DE | 1763830 | A1 | 12/1971 | |
| EP | 3373314 | A1 * | 9/2018 | ............ H01F 27/10 |
| KR | 20140076455 | A | 6/2014 | |
| KR | 101743629 | B1 | 6/2017 | |
| WO | 2012103613 | A1 | 8/2012 | |

OTHER PUBLICATIONS

Extended European Search Report dated Mar. 3, 2020 for European Patent Application No. 19382713.6, 5 pages.
Office Action, Chinese Patent Application No. 2020800510224, mailed Aug. 26, 2024, 5 pages.

* cited by examiner

NON-LIQUID IMMERSED TRANSFORMER

CROSS REFERENCE TO RELATED APPLICATIONS

This application is a 35 U.S.C. § 371 national stage application of PCT International Application No. PCT/EP2020/072699 filed on Aug. 13, 2020, which in turn claims foreign priority to European Patent Application No. 19382713.6, filed on Aug. 14, 2019, the disclosures and content of which are incorporated by reference herein in their entirety.

The present disclosure is related to transformers, more specifically to non-liquid immersed transformers comprising a fluid cooling system.

BACKGROUND ART

In order to cool down a transformer, some systems use a gas, e.g. air, to refrigerate the winding or coils thereof. Such air cooling may be forced or natural. In case of forced-air cooling, the blowing equipment e.g. a fan, may be positioned to blow the airflow to the windings. However, the cooling capacity of such airflow may not be enough to dissipate the heat.

It is also known to refrigerate non-liquid immersed transformers using hydrocoolers that pass forced-air through pipes having a cold fluid, e.g. water, circulating therein in order to refrigerate the airflow and then directing this cold airflow to the coils of the transformer to improve its cooling capacity. This solution presents several drawbacks, such as the necessity of using an enclosure thereby increasing the footprint and the cost of the transformer.

An alternative consists on using hollow conductors or metallic pipes e.g. made of copper or aluminium, as conductive turns of the windings of the transformer and also for circulating of a cooling fluid. The use of those metallic pipes involve several drawbacks: such hollow conductor pipes require an extra space in order to accommodate the conduit, i.e. to permit enough cooling fluid flow, and thus, the size i.e. the footprint, not only of the coil winding but also of the whole transformer is substantially increased. In addition, such special winding pipes are difficult to manufacture and expensive. Furthermore, the relatively large size of these hollow conductors creates a considerable increase of additional losses in the conductors due to eddy currents.

Another alternative is the use of cooling pipes around or inside the transformer coil windings having dielectric fluids such as oil, natural esters or synthetics esters fluids circulating therein. K3 fluids may also be used, i.e. dielectric fluids having a flash point higher than 300° C., but they are flammable fluids. Furthermore, some dielectric fluids may be environmentally hazardous in case of leakage or fire break out.

On the other hand, using non-dielectric fluids involves other drawbacks or technical difficulties, due to the electric fields present within the transformer and the risk of discharges or other electrical phenomena.

In conclusion, it would be desirable to provide an environmentally friendly cooling solution for a non-liquid immersed transformer, with a high cooling capacity and which is safe in operation, reduces the risk of failure and/or malfunctioning of the transformer while at the same time is cost effective.

SUMMARY

A non-liquid immersed transformer is provided. The transformer comprises a magnetic core, a coil winding forming a plurality of winding turns around the magnetic core and a cooling system. The cooling system comprises a heat exchanger, a main feeding pipe and a main return pipe, and a cooling pipe for the flow of a cooling fluid. The cooling pipe extends at least partly along the coil winding between a first point adjacent to an end of the coil winding, and a second point adjacent to the other end of the coil winding. The cooling pipe also comprises a plurality of convolutions to extend the path of the cooling fluid between one end of the winding and one of the main feeding pipe and the main return pipe.

The use of a plurality of convolutions provides longer connection pipe that extends the path of the cooling fluid, i.e. extends the length travelled by the cooling fluid before reaching the beginning of the winding and/or after leaving the termination of the winding, for example between the main feeding and/or return pipe and the beginning and/or end of the winding. A longer path increases the electric resistance of the cooling fluid which enables the cooling system to work with cooling fluids with low electrical conductivities, such as water, because even a conductive fluid is used, the plurality of convolutions increases the resistivity of such cooling fluid thereby decreasing the electric current flow therein. The flow of electric current in the cooling fluid may negatively affect the functioning of the transformer. The flow of electrical currents may heat the cooling fluid and so the cooling capacity of the fluid is deteriorated. In addition, electric currents may create additional problems such as electrolysis, ions and/or generation of gasses.

The cooling system may therefore use water as cooling fluid. Water is cheap, environmentally friendly and not flammable which leads a cost effective, environmentally safe and secure transformer.

In an example, the plurality of convolutions may comprise at least one of spiral or serpentine, thereby reducing the footprint of the transformer, i.e. the total volume or size. That is, by using spiral or serpentine shaped convolutions, manufacturing of bulky transformer is avoided.

In an example, the winding coil may comprise a covering made of insulating material which may comprise an inlet point and an outlet point for the cooling pipe, wherein the inlet point and outlet point of the housing are the points in which the cooling pipe passes through the housing.

In an example, the cooling fluid may have an electric conductivity of less than $5 \cdot 10^{-4}$ S/m which further increases the resistivity to prevent current flow within the cooling fluid.

In an example, the cooling fluid may be water, e.g. distilled and/or deionised water, the cooling fluid further comprising additives to mitigate corrosion and increase temperature range of usage but maintaining a low electrical conductivity. Additionally, the use of water in the cooling system provides a cost effective, environmentally friendly transformer which is safe in operation By using of water as cooling fluid e.g. instead of a flammable cooling fluid such us K3 fluids, provides an environmentally friendly cooling system which is cost effective and involves an increased cooling capacity. In addition, as water is not flammable the risk of fire breaking out is avoided. Moreover, the use of additives such as anti-freezer and/or anti-corrosive substances, may further enhance the maintenance of the transformer as premature failures are prevented In an example, the transformer may comprise a first conductive connector arranged at one of the winding turns to electrically connect an inner side of the cooling pipe with the turn of the coil winding. In an example, the transformer may comprise a second conductive connector so that the first conductive connector may be arranged at one winding turn and the second conductive connector may be arranged at another winding turn.

The combination of a cooling pipe comprising a plurality of convolutions and at least a first conductive connector enhances the performance and improves the efficiency of the transformer. In cases comprising a first and a second conductive connectors, the use of a plurality of convolutions also improves the functioning of the transformer.

In an example, the transformer may be a high voltage transformer i.e. generating voltages from 0.4 up to 72 kV and power ratings from 50 kVA up to 100 MVA.

BRIEF DESCRIPTION OF THE DRAWINGS

Particular embodiments of the present device will be described in the following by way of non-limiting examples, with reference to the appended drawings, in which.

DETAILED DESCRIPTION

Figure 1:
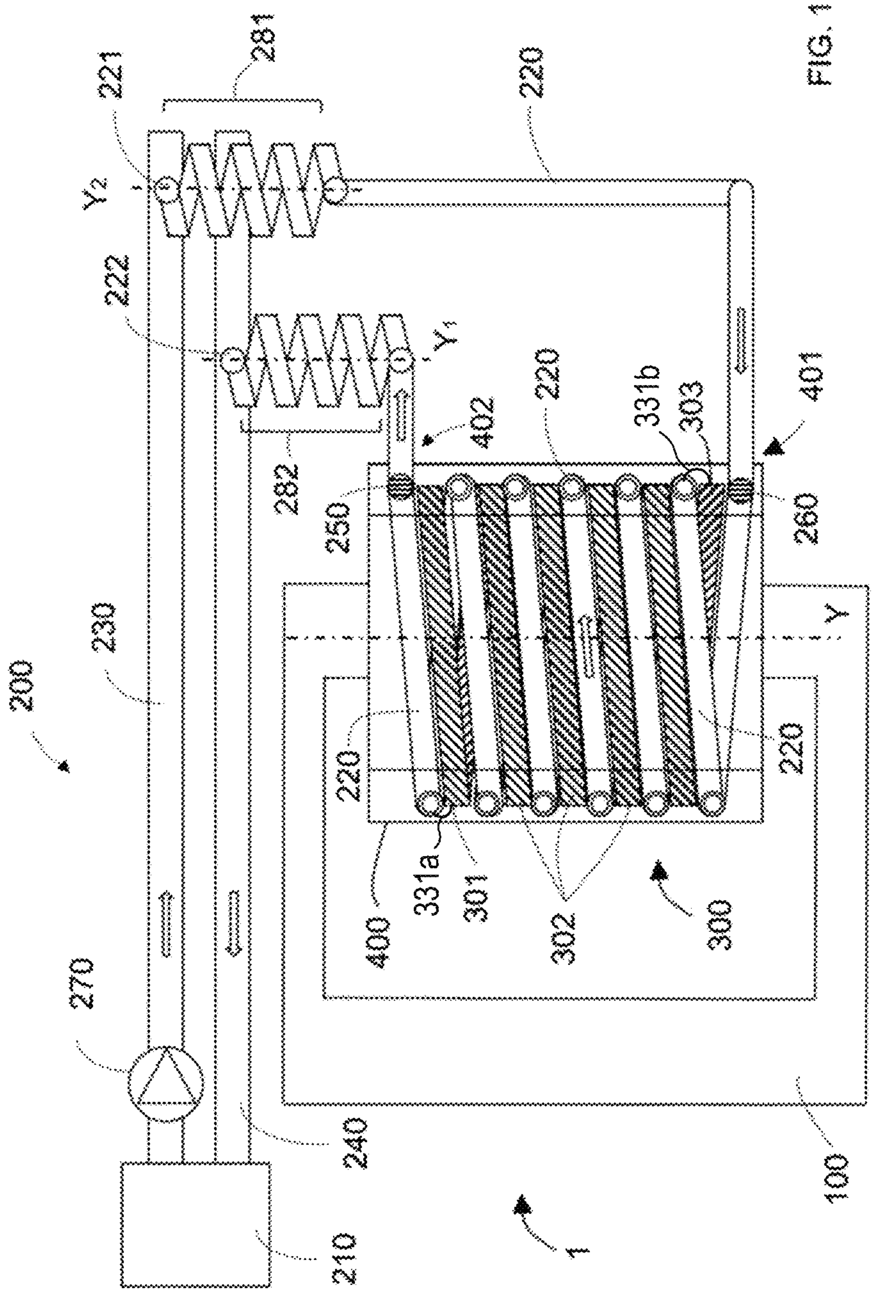
FIG. 1 schematically illustrates a simplified cross-section of a transformer and a cooling system according to an example.

FIG. 1 depicts a dry-type transformer 1 comprising a magnetic core 100 which may comprise at least a coil winding 300 around axis Y, and a cooling system 200.

The coil winding 300 may form a plurality of turns (shown in striped lines) around the magnetic core 100: a first turn 301, i.e. the beginning of winding; a plurality of intermediate turns 302 and a last turn 303, i.e. the termination of the winding. The coil winding 300 may therefore comprise two ends, i.e. portions of the winding encompassing the first turn and the last turns of the coil winding, respectively.

The coil winding 300 may be made of conductive materials e.g. copper or aluminium, that may be covered or coated with an insulating dielectric material such as polyester or epoxy resin, except in the ends in which part of the winding may need to be accessed e.g. to connect a cable to output the generated voltage.

Despite a single-phase magnetic core is depicted in FIG. 1, the transformer 1, in an example, may be a three-phase magnetic core comprising three columns, each column comprising at least a coil winding according to any of the disclosed examples. In such an example, the windings of the transformer may be connected in delta, zigzag or star connection.

The coil winding 300 may have a covering 400 made of insulating material such as epoxy resin to protect the active part of the transformer i.e. the winding turns. The covering 400 may also comprise a plurality of input/output connections e.g. for cooling pipes, for voltage bushes to output the generated voltage, etc. In an example (see FIG. 1), the covering 400 may comprise an inlet point 401 and an outlet point 402.

FIG. 1 also shows the cooling system 200 that may comprise a heat exchanger 210 to which a feeding main pipe 230 for inputting cold water into the winding of the transformer, and a return main pipe 240 for outputting the heated water from the winding of the transformer. In an example, feeding and return main pipes 230, 240 may be made of metallic material and/or may be grounded.

The cooling system 200 may also comprise a cooling pipe 220 which be made of dielectric material and which may be coupled at its both ends to the main feeding pipe 230 and the main return pipe 240 at coupling points 221, 222 respectively. The cooling pipe 220 may at least partly extend along the coil winding 300 between a first point and a second point, and wherein the cooling pipe 220 may form loops around axis Y thereby reducing the footprint i.e. the volume occupied by the cooling pipe. By "extend along the coil winding" it is meant that the cooling pipe 220 (or its loops) may be arranged alternatively between adjacent or subsequent winding turns, surrounding the coil winding, in the central empty space of the inner side of the coil winding or any combination thereof e.g. partly surrounding the coil and partly arranged between adjacent winding turns. By having the cooling pipe 220 extending along the coil winding, cooling capacity of the cooling system is improved as the generated heat at the windings may be more efficiently dissipated due to the increased effectiveness of the heat transfer solution.

The cooling pipe may comprise a first point 250 adjacent to an end of the coil winding i.e. to the first turn, and a second point 260 adjacent to the other end i.e. to the last turn of the coil winding. By "an end of the winding" it is meant a portion of the winding encompassing the first or last turn of the coil winding.

A cooling circuit for the flow of a cooling fluid may therefore be formed i.e. the cooled cooling fluid may flow from the heat exchanger to the main feeding pipe and to the cooling pipe which extends along the coil winding, and finally to the main return pipe which directs the fluid back to the heat exchanger.

The cooling pipe 220 may be made of insulating material e.g. plastic, and in order to adapt to each case restrictions e.g. necessary connections, specific distances or lengths, etc., the cooling pipe 220 may comprise different portions or pipes joined together, e.g. screwed, adhere or by any other suitable method; so as to form the whole cooling pipe 220.

The cooling system 200 may also comprise a pump 270 to force a cooling fluid throughout the entire cooling circuit, that is, to flow from the output of the heat exchanger thought the entire cooling circuit and back to the input of the heat exchanger. In an example, the flow of the cooling fluid may be clockwise (see the arrows in FIG. 1), i.e. the second point 260 of the cooling pipe would be regarded as an inlet point for the cooling fluid. In another example, the cooling fluid flow may be anti-clockwise, i.e. the first point 250 would be a cooling fluid inlet point.

The cooling pipe 220 may further comprise a plurality of convolutions 281, 282, 283, 284 to extend the path of the cooling fluid between one end of the winding and one of the main feeding pipe 230 and the main return pipe 240.

In addition, the plurality of convolutions extending the path of the cooling fluid may be arranged inside the covering 400, i.e. between an end of the winding to and an inlet/outlet point 401, 402 of the covering; or outside the covering, i.e. between an inlet/outlet point of the transformer covering 400 and one of the main pipes. That is, the convolutions may be arranged inside or outside the covering 400.

In an example, the plurality of convolutions may be arranged between the main feeding pipe 230 and the inlet point 401; between the inlet point 401 and the second point 260 i.e. the termination end of the winding; between the first point 250 and the outlet point 402 or between the outlet point 402 and the main return pipe 240.

In another example, there may be several pluralities of convolutions in different positions of the cooling fluid path, for example a plurality of convolutions extending the path of the cooling fluid between each end of the winding and the main feeding pipe and the main return pipe, respectively.

For instance, FIG. 1 shows a cooling pipe 220 comprising a plurality of convolutions 281, 282 arranged outside the covering 400. A first plurality of convolutions 281 may be arranged between the main feeding pipe 230 and the inlet point 401; and an additional plurality of convolutions 282 may be arranged between the main return pipe 240 and the outlet point 402.

Figure 2:
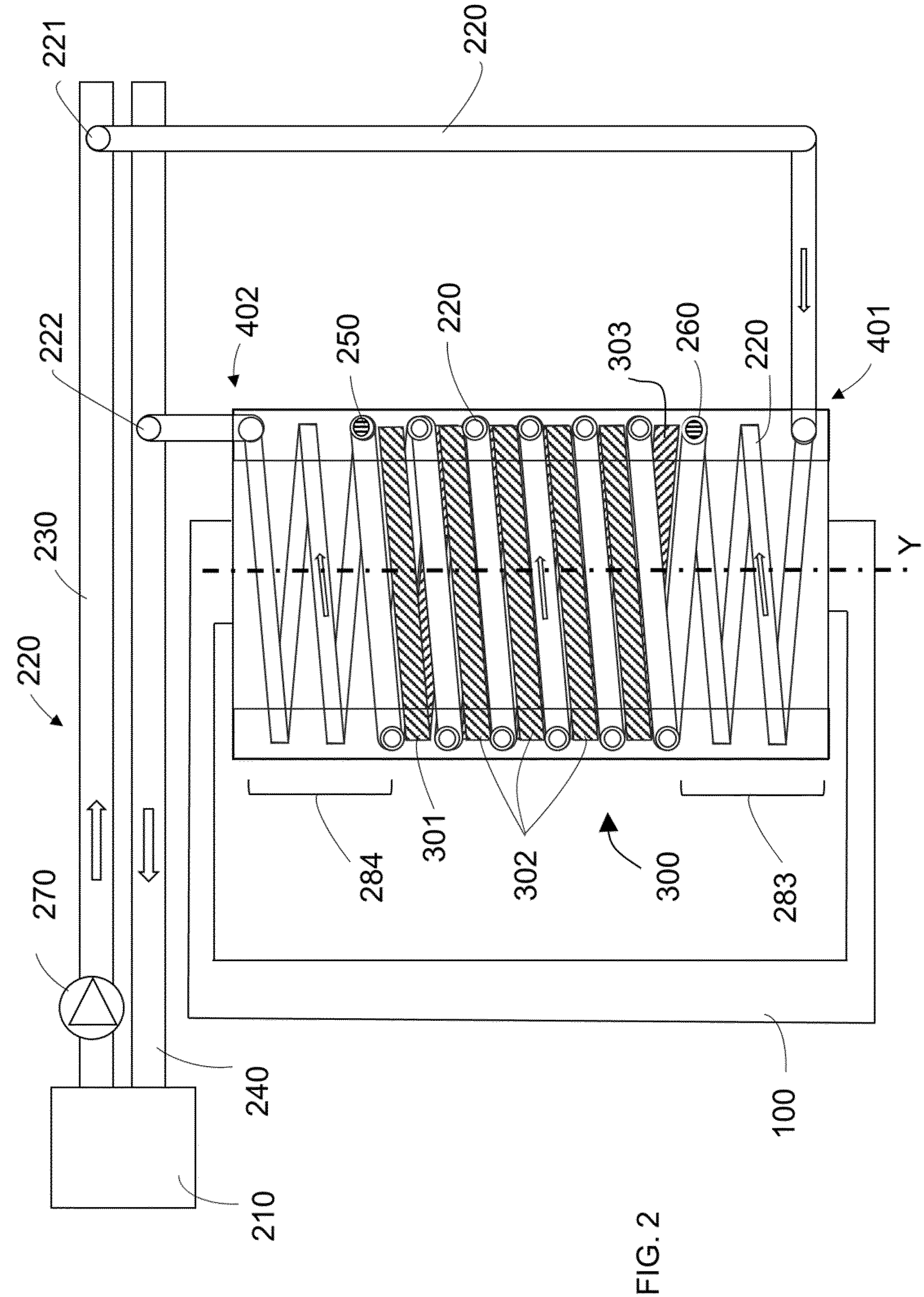
FIG. 2 schematically illustrates a simplified cross-section of a transformer and a cooling system according to another example.

FIG. 2 shows a cooling pipe 220 comprising a plurality of convolutions 283, 284 arranged inside the covering 400. A first plurality of convolutions 283 may be arranged between the inlet point 401 and the second point 260, and an additional plurality of convolutions 824 may be arranged between the first point 250 and the outlet point 402.

In an example (not shown), the transformer may comprise at least a first plurality of convolutions inside the covering and at least a further plurality of convolutions outside the covering, e.g. two pluralities of convolutions inside the covering and two outside the covering.

As the path of the cooling fluid, and thus the length of the cooling pipe, is to be extended, a larger volume is required to accommodate the extra length of cooling pipe. In an example, in order to form the plurality of convolutions, the cooling pipe 220 may be coiled around an axis Y, $Y_1$, $Y_2$. In an example, the plurality of convolutions may form a spiral, such as a helical spiral. In an example, the plurality of convolutions may form a serpentine.

By using a plurality of convolutions having spiral or serpentine shape, the required additional space, i.e. due to the extension of the cooling pipe, may therefore be reduced. The footprint of the transformer, i.e. the overall volume, is not therefore unnecessarily enlarged.

In an example, the ends of a plurality of convolutions may not be arranged close to each other in order to prevent generating a high electric field e.g. of more than 1 kV/mm.

In an example, the cooling fluid to be introduced into the cooling pipe 220 may be water. In an example, the cooling fluid may be distilled and/or deionised water which may additionally comprise freezing agents and/or additives e.g. to prevent corrosion of the cooling pipe and/or an increase the temperature range of usage. In an example, the cooling fluid may be any fluid, e.g. water, having an electric conductivity below $5 \cdot 10^{-4}$ S/m which substantially mitigates the generation electric current flow in the fluid, thus avoiding several problems such as heating of the cooling, electrolysis, ions and/or generation of gasses.

In an example, the transformer 1 may further first conductive connector 331*a* arranged at the cooling pipe 220 to electrically connect an inner side of the cooling pipe 220 with a turn 301 of the coil winding 300.

The conductive connector 331*a* allows equalising the voltage of the cooling fluid circulating inside the cooling pipe 220 and the voltage of the winding turn 301. The cooling fluid will be in contact with the inner side of the cooling pipe 220 and will therefore be electrically connected to the coil winding 300. That is, the voltage of the cooling fluid will be the same as the voltage of the winding turn 301 to which it is connected, and similar to the voltage of the surrounding turns.

This substantially prevent high voltage gradients between two (close) points, i.e. the cooling pipe 220 and a turn of the coil winding 300, thereby preventing the generation of large electric fields that may lead to partial discharges inside the transformer or direct flashovers. Partial discharges may seriously affect the functioning of the transformer and may also damage the insulation leading to a premature dielectric ageing of the insulation which will lead to a failure. Direct flashover may occur if the insulation cannot withstand the large electric field.

In an example, the transformer may comprise a second conductive connector 331*b* so that the first conductive connector 331*a* may be arranged at a winding turn 301 and the second conductive connector 331*b* may be arranged at another winding turn 303. The use of the second conductive connector 331*b* may be particularly suitable depending on the electrical connection of the transformer cores e.g. when the transformer has not grounded terminals such as a transformer with a star connection in which the neutral point is grounded.

The combination of the at least a first conductive connector 331*a* with a cooling pipe 220 comprising a plurality of convolutions enhances the performance and improves the efficiency of the transformer. In cases comprising a first and a second conductive connectors, the use of a plurality of convolutions also improves the functioning of the transformer.

Although only a number of particular embodiments and examples have been disclosed herein, it will be understood by those skilled in the art that other alternative embodiments and/or uses of the disclosed innovation and obvious modifications and equivalents thereof are possible. Furthermore, the present disclosure covers all possible combinations of the particular embodiments described. The scope of the present disclosure should not be limited by particular embodiments, but should be determined only by a fair reading of the claims that follow.

The invention claimed is:

1. A non-liquid immersed transformer comprising:

a magnetic core and a coil winding forming a plurality of winding turns around the magnetic core; and a cooling system comprising:

a heat exchanger, a main feeding pipe connected to the heat exchanger for carrying coolant fluid from the heat exchanger, a main return pipe connected to the heat exchanger for carrying coolant fluid to the heat exchanger, and a cooling pipe connected to the main feeding pipe and the main return pipe, the cooling pipe extending at least partly along the coil winding between a first point adjacent to a first end of the coil winding and a second point adjacent to a second end of the coil winding, and wherein the cooling pipe comprises a plurality of convolutions that extend a path of the cooling fluid between (1) at least one of the first end of the coil winding and the second end of the coil winding and (2) at least one of the main feeding pipe and the main return pipe.

2. The transformer according to claim 1, wherein the plurality of convolutions comprises at least one spiral or serpentine.

3. The transformer according to claim 1, comprising at least two pluralities of convolutions extending the path of the cooling fluid between each end of the coil winding and the main feeding pipe and the main return pipe, respectively.

4. The transformer according to claim 1, wherein the coil winding comprises a covering made of insulating material, the covering comprising an inlet point and an outlet point for the cooling pipe.

5. The transformer according to claim 4, wherein the convolutions extend the path between an end of the coil winding and an inlet point and/or and outlet point of the coil covering.

6. The transformer according to claim 1, wherein the cooling pipe is made of insulating material.

7. The transformer according to claim 1, wherein the cooling fluid has an electric conductivity of less than $5 \cdot 10^{-4}$ S/m.

8. The transformer according to claim 1, wherein the cooling fluid is water.

9. The transformer according to claim 1, further comprising a first conductive connector arranged at a first one of the coil winding turns, to electrically connect an inner side of the cooling pipe with the first one of the coil winding turns.

10. The transformer according to claim 9, further comprising a second conductive connector so that the first conductive connector is arranged at one winding turn and the second conductive connector is arranged at another winding turn.

11. The transformer according to claim 1, wherein the transformer is a high voltage transformer.

12. The transformer according to claim 1, wherein the plurality of convolutions comprises a helical coil.

13. The transformer according to claim 1, wherein the coil winding comprises a covering comprising an inlet point for the cooling pipe, wherein the cooling pipe is connected to the inlet point and the main feeding pipe, and wherein the plurality of convolutions are provided in the cooling pipe between the inlet point and the main feeding pipe.

14. The transformer according to claim 1, wherein the coil winding comprises a covering comprising an outlet point for the cooling pipe, wherein the cooling pipe is connected to the outlet point and the main return pipe, and wherein the plurality of convolutions are provided in the cooling pipe between the outlet point and the main return pipe.

15. The transformer according to claim 14, wherein the covering comprises an inlet point for the cooling pipe, wherein the cooling pipe is connected to the inlet point and the main feeding pipe, wherein the plurality of convolutions comprises a first plurality of convolutions, the cooling pipe further comprising a second plurality of convolutions between the inlet point housing and the main feeding pipe.

16. A non-liquid immersed transformer comprising:

a magnetic core and a coil winding forming a plurality of winding turns around the magnetic core; and a cooling system comprising:

a heat exchanger; and a cooling pipe for carrying a flow of cooling fluid between the coil winding and the heat exchanger;

wherein the cooling pipe comprises a plurality of convolutions in a path between a first end of the coil winding and the heat exchanger, wherein the plurality of convolutions is spaced apart from the coil winding along a path of the cooling pipe.

17. The non-liquid immersed transformer of claim 16, wherein the plurality of convolutions comprises a first plurality of convolutions, the cooling system further comprising a second plurality of convolutions in a second path between a second end of the coil winding and the heat exchanger.

18. The non-liquid immersed transformer of claim 16, wherein the cooling system further comprises a main feeding pipe, wherein the cooling pipe is fluidly connected to the main feeding pipe, and wherein the plurality of convolutions is between the main feeding pipe and the first end of the coil winding.

19. The non-liquid immersed transformer of claim 18, wherein:

the cooling system further comprises a main return pipe;

the cooling pipe is fluidly connected to the main return pipe;

the plurality of convolutions comprises a first plurality of convolutions; and the cooling system further comprises a second plurality of convolutions between the main return pipe and a second end of the coil winding.

20. A cooling system for a non-liquid immersed transformer including a magnetic core and a coil winding forming a plurality of winding turns around the magnetic core, the cooling system comprising:

a heat exchanger; and a cooling pipe for carrying a flow of cooling fluid between the coil winding and the heat exchanger;

wherein the cooling pipe comprises a plurality of convolutions in a path between a first end of the coil winding and the heat exchanger, wherein the plurality of convolutions is spaced apart from the coil winding along a path of the cooling pipe.

* * * * *